United States Patent
Massengill et al.

(10) Patent No.: US 6,630,187 B1
(45) Date of Patent: Oct. 7, 2003

(54) FRUIT PRESERVATION SYSTEM

(76) Inventors: Gerald Brown Massengill, 531 Co. Rd. 298, Sweetwater, TN (US) 37874; Barbie Ann Massengill, 531 Co. Rd. 298, Sweetwater, TN (US) 37874

( * ) Notice: Subject to any disclaimer, the term of this patent is extended or adjusted under 35 U.S.C. 154(b) by 47 days.

(21) Appl. No.: 10/166,987

(22) Filed: Jun. 11, 2002

(51) Int. Cl.[7] .............. A23B 7/08; A23B 7/10; A23B 7/16
(52) U.S. Cl. .............. 426/310; 426/321; 426/270; 426/639
(58) Field of Search ............... 426/310, 321, 426/270, 639

(56) References Cited

U.S. PATENT DOCUMENTS

| | | | | | |
|---|---|---|---|---|---|
| 2,874,059 A | * | 2/1959 | Powers et al. | ............... | 99/186 |
| 2,928,744 A | * | 3/1960 | Ponting | ............... | 99/105 |
| 3,472,662 A | * | 10/1969 | Mason | ............... | 99/168 |
| 3,754,938 A | * | 8/1973 | Ponting | ............... | 99/154 |
| 4,542,033 A | * | 9/1985 | Agarwala | ............... | 426/321 |
| 4,781,809 A | * | 11/1988 | Falcone, Jr. | ............... | 204/182.4 |
| 5,914,143 A | * | 6/1999 | Carroll, Jr. | ............... | 426/270 |
| 5,925,395 A | | 7/1999 | Chen | ............... | 426/321 |
| 6,183,795 B1 | * | 2/2001 | Yates | ............... | 426/385 |
| 6,254,919 B1 | * | 7/2001 | Phillips | ............... | 426/640 |

* cited by examiner

Primary Examiner—Chhaya D. Sayala
(74) Attorney, Agent, or Firm—Richard L. Mikesell

(57) ABSTRACT

A process for preserving fruit is disclosed which comprises covering the fruit with a mixture of apple cider, water, white sugar, brown sugar, and cornstarch, with optional flavoring or coloring agents such as vanilla extract or cinnamon.

9 Claims, No Drawings

FRUIT PRESERVATION SYSTEM

BACKGROUND OF THE INVENTION

The present invention generally relates to a method for preserving fruit, especially apples. The preservation of fruit by means other than refrigeration is a continuing problem, especially in climates or environments where the temperature is high, for instance, above eighty degrees Fahrenheit. At such temperatures, fruit spoils in a matter of a few days. That term is shortened even more if the fruit has been cut or sliced. Peeled bananas, for instance, can only keep a matter of a few hours before becoming brown and mushy. The problem of spoilage is aggravated when the fruit is kept hot on a steam or radiant table. Clearly, the increased temperature causes more rapid spoilage.

Historically, The preservation of fruit has been attempted by use of chemical preservatives, such as sulfites, sodium bicarbonate, and chlorides. Both U.S. Pat. No. 5,914,143 to Carroll, Jr. and U.S. Pat. No. 3,754,938 to Ponting teach the use of some of such preservatives. While effective, these methods of preservation have come into some disfavor with the consumer, as they involve the use of chemicals whose long-term consumption presents unknown health hazards. Accordingly, there is a continuing need for a preservation method to be developed that will both preserve fruit and not use artificial chemicals, in other words, is organic or natural. The present invention fulfills this need and provides other related advantages.

SUMMARY OF THE INVENTION

In accordance with the aforementioned disadvantages of prior fruit preservation methods, it is a primary object of the present invention to provide a preservation method and preservative mixture which will preserve fruits, especially apples, for many times their otherwise short unrefrigerated life, and is organic, that is, natural in composition. The preservative mixture and process has been found to work for pears, peaches, bananas, kiwi fruit, and strawberries in addition to apples. Other fruits clearly are candidates for the use of the mixture of the invention, such as berries, apricots, and so on.

In furtherance of this objective, a mixture of apple cider, water, white sugar, brown sugar, and cornstarch is used in accordance with the following description and examples. Additionally, although not adding to the preservative effect, a natural coloring agent, such as yellow egg coloring, may optionally be added. Also optionally, a natural flavoring agent such as cinnamon and vanilla extract can be added. In use, the liquid ingredients are mixed, heated to boiling, and the powdered ingredients added thereto, and dissolved therein. The mixture is simmered until it is of the desired consistency, and the fruit is then stirred into the mixture. It has been found that fruit so treated is preserved fresh and attractive for lengthy periods of time, on the order of days, and is even kept fresh and attractive for surprisingly long times when on a hot table, or under heating lights, or both.

The proportions of the various preservative ingredients may, as is usual in the art, vary somewhat. It has been found that extremely wide ranges of some of the ingredients still admit of the preservation characteristics of this mixture and method. For instance, to make five gallons of the preservative mixture, the sum of the water and the apple cider should be about four gallons with no more than half being water. Indeed, the water can be omitted entirely (obviously increasing the cost of the mixture), and just apple cider may be used to make up the four gallons. Again using the five gallon quantity, in addition to the apple cider/water mixture, white granulated sugar in a quantity of from a half pound to ten pounds can be used. Brown sugar in an amount from about a quarter pound to about a pound can be used, and cornstarch from about a quarter pound to about two pounds. Obviously, the variance in these ingredients will affect the taste and texture of the mixture, but the preservative effect is present throughout the ranges given. If coloring is desired, a drop to a few tablespoons of natural coloring can be added. Similarly, from a teaspoon to about a cup of cinnamon, for instance, can be added for flavoring. Vanilla extract also can be used as a flavoring agent, in a quantity of from a few drops to a quarter of a cup.

Other features and advantages of the present invention will become apparent from the following more detailed description.

DETAILED DESCRIPTION OF THE PREFERRED EMBODIMENTS

The preferred preservative mixture comprises the following components in the following quantities to make a five gallon quantity:
Apple Cider: two gallons
Water: two gallons
White sugar: six pounds
Brown Sugar: one-half pound
Cornstarch: one pound
(optional ingredients for flavoring and color)
Vanilla extract: one tablespoon
Cinnamon (ground): one-half cup
Yellow egg coloring: one Tablespoon To prepare preservative mixture: Place water in large pot, bring towards boil, adding sugar as the water heats. Stir, add apple cider, brown sugar, cornstarch, cinnamon, vanilla extract, and food coloring. Allow to simmer until desired consistency.

To use mixture: Put cut or whole fruit in bowl, cover with preservative and stir to coat fruit. May be kept room temperature for days, or hot for hours.

Another desirable preservative mixture comprises the following components in the following quantities to make a five gallon quantity:
Apple Cider: four gallons
White sugar: five pounds
Brown Sugar: one pound
Cornstarch: one-half pound
(optional ingredients for flavoring)
Vanilla extract: three tablespoons
Cinnamon (ground): one-quarter cup Although several embodiments of the present invention have been described in detail for purposes of illustration, various modifications of each may be made without departing from the spirit and scope of the invention. Accordingly, the invention is not to be limited, except as by the appended claims.

What is claimed is:

1. The process of preserving fruit to keep it fresh comprising coating the fruit with a mixture comprising apple cider, water, white sugar, brown sugar, and cornstarch that has been heated to boiling.

2. The process of claim 1 where the mixture is in the following proportions:

Apple Cider: two gallons

Water: two gallons

White sugar: six pounds

Brown Sugar: one-half pound

Cornstarch: one pound.

3. The process of claim 1 where the mixture additionally comprises vanilla extract.

4. The process of claim 1 where the mixture additionally comprises ground cinnamon.

5. The process of claim 3 where the mixture additionally comprises ground cinnamon.

6. The process of claim 1 where the fruit is apples.

7. The process of claim 1 where the fruit is peaches.

8. The process of claim 1 where the fruit is pears.

9. The process of claim 1 where the fruit is bananas.

* * * * *